United States Patent
Yasuda et al.

[11] Patent Number: 5,540,915
[45] Date of Patent: Jul. 30, 1996

[54] METHOD FOR MAKING HIGHLY OXIDIZED LEAD POWDER USED FOR A LEAD STORAGE BATTERY

[75] Inventors: Hiroshi Yasuda; Kazuyoshi Yonezu, both of Toyohashi; Katsuhiro Takahashi, Yawata; Kenzo Yamamoto, Toyohashi, all of Japan

[73] Assignee: Matsushita Electric Industrial Co., Ltd., Japan

[21] Appl. No.: 478,597

[22] Filed: Jun. 7, 1995

Related U.S. Application Data

[63] Continuation-in-part of Ser. No. 902,401, Jun. 17, 1992, abandoned, which is a continuation of Ser. No. 642,124, Jan. 14, 1991, abandoned, which is a continuation of Ser. No. 449,262, Dec. 12, 1989, abandoned.

[30] Foreign Application Priority Data

Dec. 12, 1988 [JP] Japan ..................... 63-314633

[51] Int. Cl.$^6$ .................................. C01G 21/02
[52] U.S. Cl. ........................... 423/620; 423/619
[58] Field of Search ....................... 423/619, 620

[56] References Cited

U.S. PATENT DOCUMENTS

| | | | |
|---|---|---|---|
| 1,482,327 | 1/1924 | Thibault | 423/620 |
| 1,992,395 | 2/1935 | Rose | 423/620 |
| 2,237,043 | 4/1941 | Wilson | 423/620 |
| 2,347,131 | 4/1944 | Seabury | 423/620 |
| 3,623,838 | 11/1971 | Kunz et al. | 423/619 |

FOREIGN PATENT DOCUMENTS

| | | |
|---|---|---|
| 50-1706 | 1/1975 | Japan . |
| 50-17033 | 6/1975 | Japan . |
| 50-36238 | 11/1975 | Japan . |
| 55-40522 | 1/1977 | Japan . |
| 1400885 | 7/1975 | United Kingdom . |

*Primary Examiner*—Steven Bos
*Attorney, Agent, or Firm*—Wenderoth, Lind & Ponack

[57] ABSTRACT

Highly oxidized lead powder containing red lead not more than 90% is efficiently produced by maturing the lead powder material at a low temperature section of a furnace keeping the temperature less than 100° C. by spraying water to the material and then, by heating the same from 400° to 500° C. at a high temperature section of the furnace. The highly oxidized lead powder produced in this method is preferable as active material of a lead storage battery, that is, a paste preparation and formation treatment become easy and a long life electrode is obtained.

4 Claims, 1 Drawing Sheet

METHOD FOR MAKING HIGHLY OXIDIZED LEAD POWDER USED FOR A LEAD STORAGE BATTERY

This is a continuation-in-part of U.S. application Ser. No. 07/902,401, filed Jun. 17, 1992, now abandoned; which is a continuation of Ser. No. 07/642,124, filed Jan. 14, 1991, now abandoned; which is a continuation of U.S. Ser. No. 07/449,262, filed Dec. 12, 1989, now abandoned.

BACKGROUND OF THE INVENTION

The present invention relates to a method and an apparatus for making powder of intensively oxidized lead and more specifically, of highly oxidized lead containing a great amount of red lead for use in a lead storage battery.

BACKGROUND ART

There has been a known art that red lead ($Pb_3O_4$) is added to active material to increase the efficiency of formation charging of electrode plates of a lead battery. Such red lead is commonly made by heating raw lead powder material which has been produced through a ball-mill or Barton-pot method, in the atmosphere of oxygen or air at a temperature of about 400° to 450° C. Particularly, the raw lead powder material is preferably used containing 60% to 85% tetragonal lead monoxide ($\alpha$-PbO) or red litharge in weight ratio (or in litharge content, referred to as LC hereinafter).

It should be noted that when raw lead powder having such an LC rate is directly supplied into a high-temperature heating furnace such as a kiln, its temperature sharply increases due to the self-heatup resulting from abrupt oxidation. When the temperature rises to about 600° C., rhombic phase lead monoxide ($\beta$-PbO) of yellow color which is called yellow lead, yellow oxide or yellow litharge is produced. Once the yellow lead has been created, the production of red lead is slowed down even if the temperature of raw lead powder material is reduced closely to 450° C.

According to a prior art, to avoid such a problem, raw lead powder material is preparatorily oxidized in the outside for an extensive period of time prior to heating in a furnace. However, most of lead powder in the air is self-heated when no water is applied and increases its temperature upto about 100° C. and if possible, to about 400° C. Therefore, the control of the temperature increase by self-heatup is tried in the art so that the raw lead powder can be kept at a lower temperature of several tens degrees for a certain length of time.

Rose et al. (U.S. Pat. No. 1,992,395) produce red lead in continuous fashion in a single rotating retort in which the inlet to the retort is kept at a lower temperature and the outlet is kept at a higher temperature.

Another method may be used in which raw lead powder material supplied with water is consistently processed for oxidation in the atmosphere at a temperature of several tens of degrees. Then, processed lead powder of more than 90% in the LC is heated in a furnace, whereby highly oxidized lead powder will readily be produced containing a high proportion of red lead ($Pb_3O_4$). Seabury et al. (U.S. Pat. No. 2,347,131) also teaches that adding water is effective to convert yellow litharge to red litharge.

It has been discovered by the inventors of this invention with results of long-term study and examinations that highly oxidized lead powder containing a small portion of lead monoxide or lead hydroxide which works favorably in binding with other active components of the electrode plate in a lead battery, is preferred as an electrode plate active material of the lead battery rather than a largely red lead containing powder in which almost all substances have changed to red lead particles.

However, it is quite difficult to produce such intermediately conditioned, highly oxidized lead powder at low cost for industrial purpose in any of the foregoing arts which allow lead powder material to be supplied into a high-temperature furnace after preliminalily oxidized in a separate procedure.

According to the known procedures of maturing oxidation of raw lead powder in the outside of the furnace, a large amount of lead powder which has been processed by maturing oxidation is cooled down to outside temperature of a furnace before loaded into the furnace. This not only results in abundant loss of heat but causes the temperature in the furnace to become unstable at the entrance region, providing an unfavorable condition in reproducible production of red lead. Although it is possible to produce highly oxidized lead powder containing almost 100% red lead by heating the raw lead powder for a long time, it is difficult to get the lead powder which contains a desired amount of red lead. The lower the percentage of red lead contained down to 95% or 80%, the more the length of time varies for producing the highly oxidized lead powder containing a desired amount of red lead which is appropriate for an electrode plate active material.

When red lead is added to the electrode plate active material to increase the charging efficiency of a battery, the content of red lead determines a rate of charging efficiency. If the content of red lead varys considerably, the setting of charging capacity is unfavorably affected. Also, eliminating the inconsistency of red lead content involves no difference from the use of 100% red lead powder.

Accordingly, it was important, however, difficult to obtain the intermediately oxidized lead powder contained mainly highly oxidized lead powder including a desired amount of red lead, and partially among particles, lead monoxide and lead hydroxide which both act important roles in binding with other electrode plate active materials.

The present invention is primarily directed, in view of the consistency of producing red lead, towards a method and an apparatus for producing highly oxidized lead powder containing a desired proportion of red lead in industrial process uniformly and efficiently within a short period of time.

Another object of the present invention is to provide a production method in which the change to red lead not larger than 90% can efficiently be made by adding water to raw lead powder material at a part of a furnace to maintain a low temperature increasing the red litharge content and in sequence, heating the lead powder material added with water.

A further object of the present invention is to provide a method of producing highly oxidized lead powder having red lead not larger than 90% with less inconsistency.

Other objects and details of the present invention will be described hereinafter.

SUMMARY OF THE INVENTION

To achieve the foregoing objects, a method of producing highly oxidized lead powder according to the present invention, comprises the processes of maturing oxidation for increasing the red litharge content of lead powder material from 60–80% to 80–90% by supplying water to the lead powder material and of heating the lead powder processed by maturing oxidation for promotion of change to red lead not larger than 90%. The two processes are carried out in sequence within the same reaction furnace.

In the maturing oxidation process, the amount of water added to the lead powder material supplied into the reaction furnace is preferably more than 4 weight percent and less than 10 weight percent of the amount of the raw lead powder. The raw lead powder material may be used of more than 60% in the LC rate and more preferably, of 60% to 80%. Additionally at the initial stage of the maturing oxidation process, the time for keeping the lead powder material with water below 100° C., is preferably more than 15 minutes and less than 120 minutes. The keeping time may freely be controlled by the temperature of the water. For more efficiency in the process, the water temperature may be kept between 60° C. and the boiling point for a period of 30 to 80 minutes.

An apparatus for making highly oxidized lead powder according to the present invention, comprises a reaction furnace and a water supply device, e.g. a spray or a shower, for applying water onto lead powder material. The reaction furnace has a low temperature section provided in the raw lead powder material supply inlet side thereof for maturing oxidization of the lead powder material and a high temperature section connected to the end of the low temperature section for heating of the lead powder processed by maturing oxidation.

It is preferred in the foregoing arrangement that the water supply inlet of the water supply device is disposed over the low temperature section in the reaction furnace and also, arranged of shower type configuration for spraying water radially onto the lead powder material so that the water can be uniformly applied to and kept intimate with the lead powder material.

In the method of the present invention, the maturing oxidation process and the heating process are successively carried out in the same reaction furnace while the raw lead powder material is heated by self-heatup resulting from spontaneous oxidation within a short period of time during the maturing oxidation process, however, the abrupt temperature increase is controlled by a latent heat in the water. Thus, the generation of yellow lead is controlled, and the red litharge content increases. Accordingly, the shift to the heating process can continuously be executed without interruption of the heating procedure.

While the heatup in the maturing oxidation process occurs within the furnace, the lead powder processed by maturing oxidation is transferred to the heating process in the same furnace without lowering the temperature of the oxidation process, ensuring no loss of heat. Also, the temperature is kept stable at the initial stage of the heating process. Accordingly, the condition of producing red lead remains unchanged and the heating process becomes facilitated in control with appropriate setting of a time of holding the lead powder inside the furnace. As a result, the heating process becomes easy to control and 10 hours heating process gives highly oxidized lead powder of 90% red lead content with a high degree of uniformity.

In the apparatus of the present invention, the low temperature section and the high temperature section are connected to each other in the furnace while the water supply device is provided in the low temperature section, so that the production of highly oxidized lead powder through the foregoing processes can efficiently be carried out without any interruption of operation.

BEST MODE OF THE INVENTION

Embodiments of the present invention will be described in the form of a method and an apparatus adapted to the method referring to the accompanying drawings.

Figure 1:
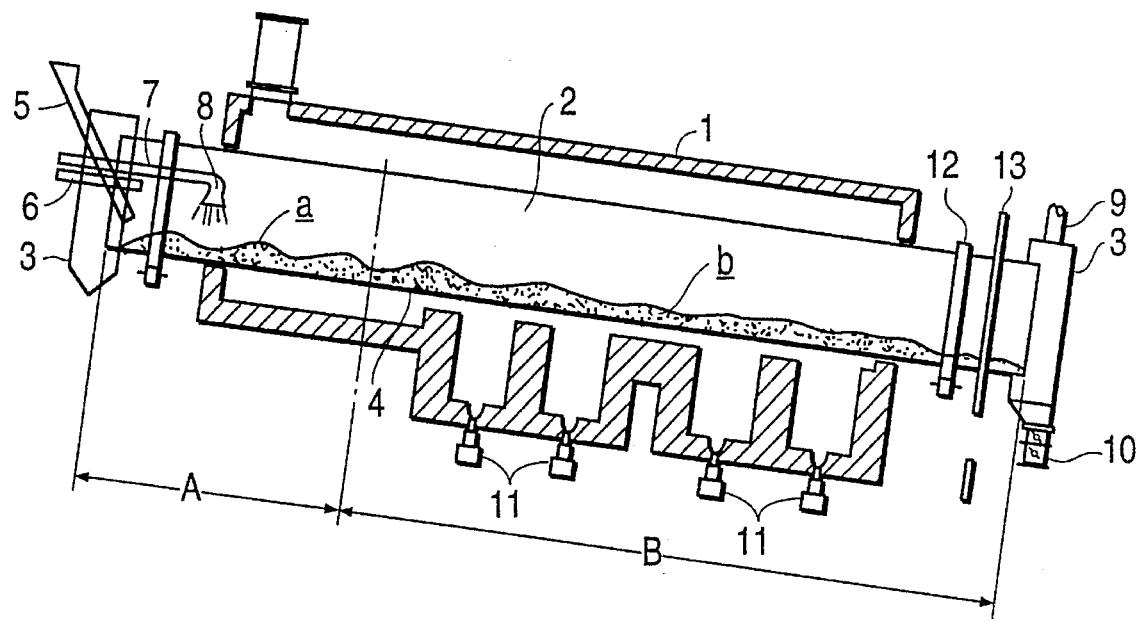
FIG. 1 is a cross sectional view illustrating the outline arrangement of an apparatus for making highly oxidized lead powder according to an embodiment of the present invention.

FIG. 1 illustrates the outline arrangement of an apparatus according to the present invention in which represented by 1 is a reaction furnace or a rotary cylindrical kiln having a furnace body 4 formed by closing a cylinder 2 at both its ends with side plates 3, 3 and arranged at an angle of 0.1 to 1 degrees to the horizontal line so as to be elevated at the material supply inlet side thereof. The furnace body 4 is supported by supports 12 for rotation by a drive gear 13 of a motor. There also are provided a lead powder supply inlet 5 of tubular shape, an air intaking inlet 6, and a water supply inlet 8 of a water supply means 7, all of which are inwardly extended through the side plate 3 to the inlet end inside of the furnace body 4. Both an air exhaust outlet 9 and a discharge outlet 10 for highly oxidized lead powder are outwardly projected through the other side plate 3 from the outlet end of the furnace body 4. The air intaking inlet 6 and exhaust outlet 9 are provided for control of the amount of air supply in the furnace in order to restrict the generation of yellow lead at the initial stage of maturing oxidation process.

The furnace body 4 of the kiln 1 is composed of a couple of low and high temperature sections A and B; the low temperature section A provided in the side of the supply inlet 5 for maturing oxidation of the raw lead powder material a and the high temperature section B provided in the side of the discharge outlet 10 for heating the lead powder b processed by maturing oxidation. There is also provided a heating source 11 formed mainly of e.g. a gas burner for heatup of the furnace body 4 and disposed on the outer periphery of the high temperature section B of the furnace 4.

The water supply inlet 8 of the water supply device 7 extends to the low temperature section A of the furnace body 4 and is arranged of shower type to spray water radially onto the lead powder material in the low temperature section A. The water supply device 7 may be equipped with an implement for sprinkler action.

For production of highly oxidized lead powder with the use of such an apparatus as having the foregoing arrangement, the raw lead powder material is employed having the red litharge content of more than 60% and preferably, between 60% and 80%. The red litharge content in the raw lead powder can be controlled by changing the preparation conditions. The other components contained in the raw lead powder are metallic lead, lead hydroxide, oxide of lead lower than red lead and others. When an amount of the lead powder material a is supplied through the supply inlet 5 into the low temperature section A of the furnace body 4, water is applied through the shower type water supply inlet 8 of the water supply device 7 for spraying a determined amount of water to the lead powder material a which is in turn oxidized for a duration at the low temperature section A of the furnace body 4.

Table 1 shows how the LC rate of the raw lead powder which was 80% before maturing oxidation varys in relation with the amount of applying water and the time of maturing oxidation. The time of maturing oxidation can be controlled by altering the transfer speed of the raw lead powder with a change of the rotating speed of the reaction furnace.

TABLE 1

| Amount of applying water | LC (%) after maturing oxidation |  |  |  |  |  |  |  |
|---|---|---|---|---|---|---|---|---|
| | Time of maturing oxixation (minutes) (maturing temperature: about 80° C.) min. |  |  |  |  |  |  |  |
| (wt %) | 5 | 10 | 15 | 20 | 60 | 90 | 120 | 180 |
| wt % | % |  |  |  |  |  |  |  |
| 2 | 80 | 81 | 81 | 82 | 82 | 82 | 83 | 83 |
| 4 | 81 | 82 | 83 | 84 | 86 | 88 | 90 | 92 |
| 6 | 81 | 82 | 84 | 86 | 88 | 89 | 92 | 93 |
| 8 | 81 | 83 | 85 | 87 | 88 | 90 | 93 | 93 |
| 10 | 81 | 83 | 85 | 87 | 88 | 90 | 93 | 93 |
| 12 | Powder turns to a paste |  |  |  |  |  |  |  |

The supply of water to the raw lead powder material a can be adjusted freely, and is preferably 4–10 weight percent and more preferably, 6–8 weight percent of the total amount of the raw lead powder material for maturing of the lead powder material a restricting the abrupt oxidation caused by its self-heatup. More particularly, if the supply of water is less than 4 weight percent, the result of maturing becomes unfavorable and if over 10 weight percent, the lead powder material a turns to a paste in solidification. As a result of over 10 wt % addition of water, portions of the powder are adhesively attached to the inner wall of the kiln furnace, causing the process of oxidation to be interrupted with difficulty.

The application of water to the raw lead powder material may be executed outside the kiln 1 before loaded into the same. However, the control of temperature in the furnace will be difficult because lead powder material with water is oxidized instantly outside the furnace.

As the foregoing process is made in the low temperature section A, the litharge content of the lead powder material a increases. During this process, while the lead powder material a is heated by its self-heatup in a short period of time, its thermal increase is controlled to prevent abrupt heatup by a latent heat in the water. The generation of yellow lead is thereby controlled and there is an increase in the LC from 60–80% to 80–90%, then the lead powder is in sequence transferred to the high temperature section B kept at a temperature between 400° C. and 500° C.

It is suggested that the time of keeping the lead powder material a at below 100° C. at the initial stage of the maturing oxidation process, should be more than 15 minutes to ensure an increase of 5% in the LC for example from 80% to 85%. Though LC increases with the increases of time, it saturates over 120 minutes and no prominent rise in LC will result. Accordingly, preferable keeping time is between 15 and 90 minutes.

The lead powder b processed by maturing oxidation is then transferred to the high temperature section B of the furnace body 4 and heated at 400° to 500° C. for example 450° C. for 10 hours to have a desired portion of red lead for example 90%.

As the matured oxidized lead powder b is successively transferred to the high temperature section B in the same furnace, no loss of heat due to transfer occurs and also, the temperature at the front end of the high temperature section B remains stable for heating. Accordingly, the condition of producing red lead can be kept consistent.

Figure 2:
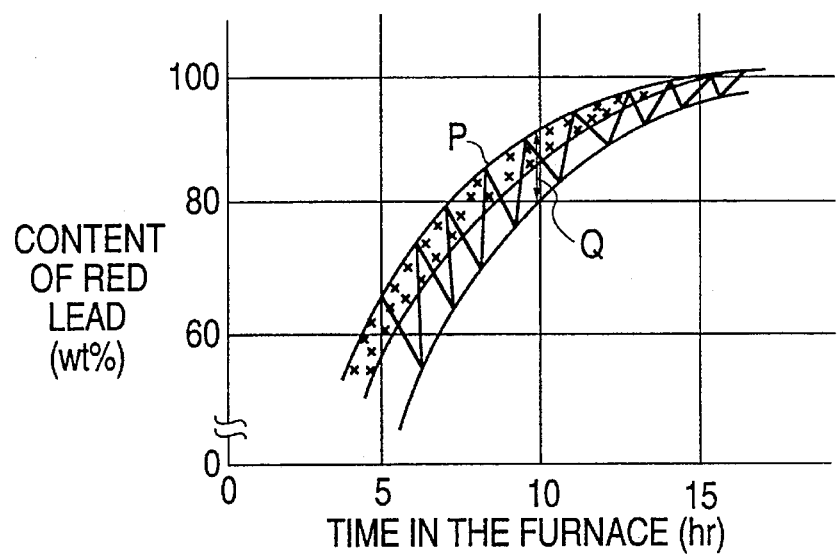
FIG. 2 is a diagram showing the relation between the content of red lead and the keeping time of lead powder material in a furnace according to both methods of the present invention and of a prior art.

FIG. 2 shows the relation between the total keeping time of powder in the furnace body 4 of the kiln 1 and the content of red lead of the product. In FIG. 2, an example P is the result with 6 wt % of the water application and proves that the content of red lead is freely given within a favorable range in relation to the keeping time. For example, 10 hours keeping time produces red lead content of 90%. Another example Q in which the lead powder material is added with water outside and matured in the atmosphere at a temperature of several tens degrees before loaded into the furnace, displays a high degree of inconsistency in the generation of red lead. In the prior art employing raw lead powder with no water applied for direct supply into a furnace, the abrupt heatup at loading caused mix-up with a considerable amount of yellow lead and the control of the generation of red lead was found difficult to carry out.

As set forth above, according to the present invention, the method of producing highly oxidized lead powder is provided in which both the maturing oxidation process for increasing the red litharge content from 60–80% to 80–90% of lead powder material supplied with water and the heating process for heating up the lead powder material processed by maturing oxidation to promote the change to red lead not larger than 90%, are successively carried out within the same reaction furnace. Also, the apparatus adapted to the foregoing production method is provided comprising the reaction furnace which includes the low temperature section provided in the lead powder material supply inlet side thereof for maturing oxidation of the lead powder material and the high temperature section connected to the end of the low temperature section for heating of the lead powder processed by maturing oxidation, and the water supply means for applying water onto the lead powder material.

When the present highly oxidized lead powder is used as a component material of electrode plate active substance for a lead battery, oxides of lead lower than red lead such as lead monoxide and lead hydroxide, which exist more than 10% in each particle, strengthen the binding with other highly oxidized lead powder and a battery grid during maturing and drying of a paste. When red lead is included more than 90%, the effect of this binding is weak. The advantage will be apparent that the present highly oxidized lead powder including red lead of not more than 90% containing a component of lead oxide or a binding component of more than 10% of lead powder which is essential for increase of the life of a battery, is obtained having a uniform quality. Additionally, the charging efficiency of the lead battery will be improved.

The other advantages are that the loss of energy during the process can be eliminated and that the amount of air in the furnace is controlled for restriction of the generation of yellow lead which is produced at the initial stage of the maturing oxidation process while the latent heat in the sprayed water can also be utilized with equal success.

Furthermore, the preparation method of an active material paste for a lead storage battery active material using the present highly oxidized lead powder is as follows.

20 wt % of highly oxidized lead powder containing 90% red lead and 10% other lead materials comprising a slight amount of metal lead and lead monoxide is admixed with 80 wt % raw lead powder produced by a conventional ball-mill or Barton-pot method, then 70 ml dilute sulfonic acid of 1.40 density and 110 ml water are added to the said mixed powder of 1 kg and mixed by stirring for 30 minutes.

During the mix by stirring, a binding component such as lead monoxide which remains in the highly oxidized lead powder enhances the binding strength among powders. It also enhances the binding strength of paste with the grid which is an electrode plate support.

In addition, because a highly oxidized lead powder containing 90% red lead is mixed with an ordinary raw lead powder in a paste, the time for electrode plate formation becomes about 50% shorter compared with a conventional past comprising an ordinary raw lead powder. Accordingly, electric energy for formation is saved.

Furthermore, a long life electrode is obtained, because the binding strength among powder in a paste and that of the paste with a grid are enhanced.

We claim:

1. A method of making a highly oxidized lead powder, containing red lead ($Pb_3O_4$) suitable for an electrode active material of a lead battery, which comprises:

(a) subjecting a raw lead powder consisting essentially of metallic lead and 60 to 80% by weight red litharge ($\alpha$-PbO) to maturing oxidation which increases the red litharge content of the raw lead powder at least 5% to produce a matured material having a red litharge content of 80 to 90% by weight, thereby realizing a spontaneous rise in temperature, and controlling said temperature rise to below 100° C. for an initial 15 to 90 minutes of said maturing oxidation, by adding cooling water to said raw lead powder in order to restrict the production of yellow litharge ($\beta$-PbO); and (b) then heating the matured material from step (a) to a temperature of 400° to 500° C. to produce a red lead content of 80 to 90 weight %, steps (a) and (b) being successively performed within the same rotary kiln.

2. The method of making a highly oxidized lead powder as claimed in claim 1 wherein the water added to said raw lead powder material is from 4 to 10 wt. percent of the raw lead powder material.

3. The method of making a highly oxidized lead powder as defined in claim 1, wherein the red litharge content of the raw lead powder is more then 60 wt. percent.

4. The method of making a highly oxidized lead powder as claimed in claim 3, wherein the red litharge content of the material is 80 to 85 wt. percent.

* * * * *